(12) United States Patent
Yamada

(10) Patent No.: US 11,303,061 B2
(45) Date of Patent: Apr. 12, 2022

(54) CONNECTOR AND MANUFACTURING METHOD THEREFOR

(71) Applicant: Sumitomo Wiring Systems, Ltd., Mie (JP)

(72) Inventor: Hiroki Yamada, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 144 days.

(21) Appl. No.: 16/765,189

(22) PCT Filed: Nov. 20, 2018

(86) PCT No.: PCT/JP2018/042755
§ 371 (c)(1),
(2) Date: May 19, 2020

(87) PCT Pub. No.: WO2019/102977
PCT Pub. Date: May 31, 2019

(65) Prior Publication Data
US 2020/0350723 A1    Nov. 5, 2020

(30) Foreign Application Priority Data

Nov. 22, 2017 (JP) .............................. JP2017-224886

(51) Int. Cl.
*H01R 13/504* (2006.01)
*B29C 45/14* (2006.01)
(Continued)

(52) U.S. Cl.
CPC ..... *H01R 13/504* (2013.01); *B29C 45/14065* (2013.01); *B29C 45/2708* (2013.01); *B29L 2031/36* (2013.01)

(58) Field of Classification Search
CPC ............ H01R 13/504; B29C 45/14065; B29C 45/2708
(Continued)

(56) References Cited

U.S. PATENT DOCUMENTS 7,189,920 B2 * 3/2007 Asao ................. B29C 45/14065
                                                      174/50
10,975,817 B2 * 4/2021 Kato ....................... B29C 70/70
(Continued)

FOREIGN PATENT DOCUMENTS

JP        7-46481    3/1982
JP     2002-200643   7/2002
(Continued)

OTHER PUBLICATIONS

International Search Report dated Feb. 26, 2019.

*Primary Examiner* — Alexander Gilman
(74) *Attorney, Agent, or Firm* — Gerald E. Hespos; Michael J. Porco; Matthew T. Hespos

(57) ABSTRACT

A connector (1) includes a plurality of connector terminals (3), core resin portions (2A), (2B), nuts (4) and an outer resin portion (5). A plurality of the nuts (4) are arranged to face a nut facing surface (21A) of the core resin portion (2A). The outer resin portion (5) covers the core resin portions (2A), (2B) and the nuts (4) with exposed surfaces (25) of the core resin portions (2A), (2B) and outer end surfaces (41) of the nuts (4) exposed. Injection marks (51) during molding of the outer resin portion (5) are formed on a surface of a part of the outer resin portion (5) covering an opposite side surface (22B) located on a side opposite to the nut facing surface (21A).

8 Claims, 16 Drawing Sheets

(51) Int. Cl.
   *B29C 45/27* (2006.01)
   *B29L 31/36* (2006.01)
(58) Field of Classification Search
   USPC .......................................................... 439/638
   See application file for complete search history.

(56) References Cited

U.S. PATENT DOCUMENTS

2005/0218558 A1   10/2005  Asao
2017/0170366 A1*  6/2017  Fukuda ............. H01L 23/49575
2020/0350723 A1*  11/2020  Yamada ................ H01R 31/06

FOREIGN PATENT DOCUMENTS

JP    2005-288783    10/2005
JP    2013-020848    1/2013
JP    2017-105150    6/2017

* cited by examiner

CONNECTOR AND MANUFACTURING METHOD THEREFOR

BACKGROUND

Field of the Invention

The invention relates to a connector including a plurality of connector terminals and a manufacturing method therefor.

Related Art

A connector provided with connector terminals is used in wiring an electronic control component and a control device in various machine components. The connector terminals may be arranged in a connector case made of resin by performing insert molding. Further, a nut for mounting the connector on various mounting components may be arranged in the connector case by performing insert molding.

Japanese Unexamined Patent Publication No. 2017-105150 discloses an insert molded article and a manufacturing method where a through nut and a lid are covered by insert molding of resin so that a first opening of the through nut is closed by the lid and a second opening of the through nut is exposed to outside. In performing the insert molding, an inner peripheral side of the second opening of the through nut is fit to a positioning protrusion provided in a lower mold, and an outer peripheral side of the second opening of the through nut is fit to an outer peripheral rib provided in the lower mold. In this way, the through nut is positioned with respect to the lower mold.

Further, U.S. Pat. No. 7,189,920 discloses an insert molded article manufacturing method where a fastener is provided in a lower mold and is engaged threadedly with a screw hole of a bag-like nut through which the screw hole does not penetrate. When insert molding is performed, the nut is fixed to the lower mold by the fastener.

However, in Japanese Unexamined Patent Publication No. 2017-105150, the through nut is supported only by the lower mold. Thus, when the molten resin injected into the cavity from a gate of the upper mold collides with the lid, the postures of the lid and the through nut may be inclined with respect to the lower mold Further, in U.S. Pat. No. 7,189,920, the fastener serving as a movable part rotatable with respect to the lower mold needs to be provided in the lower mold to fix the nut to the lower mold. Thus, the structure of the lower mold for insert molding becomes complicated.

Further, in Japanese Unexamined Patent Publication No. 2017-105150, the lid needs to be covered with resin and cannot be supported by the upper mold. Further, in, U.S. Pat. No. 7,189,920 the nut needs to be covered with resin, and therefore cannot be supported by the upper mold. Thus, further ingenuity is necessary to mold a connector including a nut whose position and posture are maintained with high accuracy using a mold having a simple structure.

The invention was developed in view of such a problem and aims to provide a connector can be molded by a mold having a simple structure and in which the position and posture of a nut are maintained with high accuracy, and a manufacturing method therefor.

SUMMARY

A first aspect of the invention is directed to a connector with connector terminals and a core resin portion formed such that the end parts of the connector terminals project from the core resin portion while intermediate parts of the connector terminals are embedded in the core resin portion. One or more nuts are arranged to face a nut facing surface of the core resin portion. A screw hole extends from an outer end surface located on a side opposite to a side facing the nut facing surface, and an outer resin portion covers the core resin portion and the nut with a part of the core resin portion and the outer end surface exposed. An injection mark is formed during molding of the outer resin portion. The injection mark is formed on a surface of a part of the outer resin portion covering an opposite side surface of the core resin portion that is located on a side opposite to the nut facing surface.

A second aspect of the invention is directed to a connector manufacturing method by insert molding. The method includes arranging a core resin portion having connector terminals arranged therein and one or more nuts arranged to face the core resin portion in a mold and injecting a resin material into the mold to form an outer resin portion for covering the core resin portion and the nut. The manufacturing method comprises causing the core resin portion and the nut to face each other in the mold, and causing a gate of the mold for the resin material to face a side surface of the core resin portion located on a side opposite to a nut facing surface facing the nut. The method then includes injecting the resin material toward the opposite side surface from the gate.

The connector of the first aspect is molded using the core resin portion having the connector terminals arranged therein as an insert component when insert-molding the outer resin portion.

The core resin portion can be molded by arranging the connector terminals in a mold and injecting a resin material for the core resin portion into the mold. Further, the connector can be molded by arranging the core resin portion having the connector terminals arranged therein and the nut in the mold and injecting the resin material for the outer resin portion into the mold. In molding this connector, the core resin portion can be utilized to maintain the nut in a specified posture.

The one or more nuts of some embodiments are arranged in the nut facing surface of the core resin portion, and a part of the core resin portion and the outer end surface of the nut are exposed to the outside of the connector. Further, the injection mark during the molding of the outer resin portion is formed on the surface of the part of the outer resin portion covering the opposite side surface of the core resin portion.

The part of the core resin portion exposed on the surface of the outer resin portion may be utilized to hold the core resin portion in the mold when molding the outer resin portion in the mold. Further, the outer end surface of the nut is utilized to hold the nut in the mold when molding the outer resin portion in the mold. The nut is supported also by the core resin portion held in the mold so that the posture thereof does not change.

The injection mark of the outer resin portion is formed when injecting the resin material for molding the outer resin portion into the mold from the gate provided in the mold. The core resin portion and the nut are arranged in the mold when molding the outer resin portion in the mold. At this time, the core resin portion and the nut are not sandwiched completely by the mold to enable the core resin portion and the nut to be arranged in the mold. That is, a tiny clearance is formed between the core resin portion and the nut. The posture of the nut may be changed by the resin material flowing in the mold.

Accordingly, the nut can be pressed against the mold via the core resin portion by injecting the resin material for constituting the outer resin portion toward the opposite side surface of the core resin portion from the gate. Further, if the core resin portion is formed with a through hole as described later, the nut can be pressed directly against the mold, utilizing the through hole by the injection of the resin material. Thus, no clearance is formed between the mold and the nut, utilizing a pressure during the injection of the resin material. In this way, the nut is maintained in the targeted specified posture in the connector manufactured by molding the outer resin portion.

Further, the nut is positioned by a shape changed portion, such as a projection, formed in the mold when molding the outer resin portion. This shape changed portion for positioning the nut need not be a movable portion capable of moving with respect to the mold through rotation, a sliding movement or the like, and is formed by changing the shape of the mold. In this way, the structure of the mold is not complicated.

Therefore, the connector of the first aspect can be molded by the mold having a simple structure, and can be molded with the position and posture of the nut maintained with high accuracy.

The connector manufacturing method of the second aspect is a method suitable for manufacturing the connector of the first aspect. According to this connector manufacturing method, the connector can be molded with the position and posture of the nut maintained with high accuracy by the mold having a simple structure.

DETAILED DESCRIPTION

Figure 1:
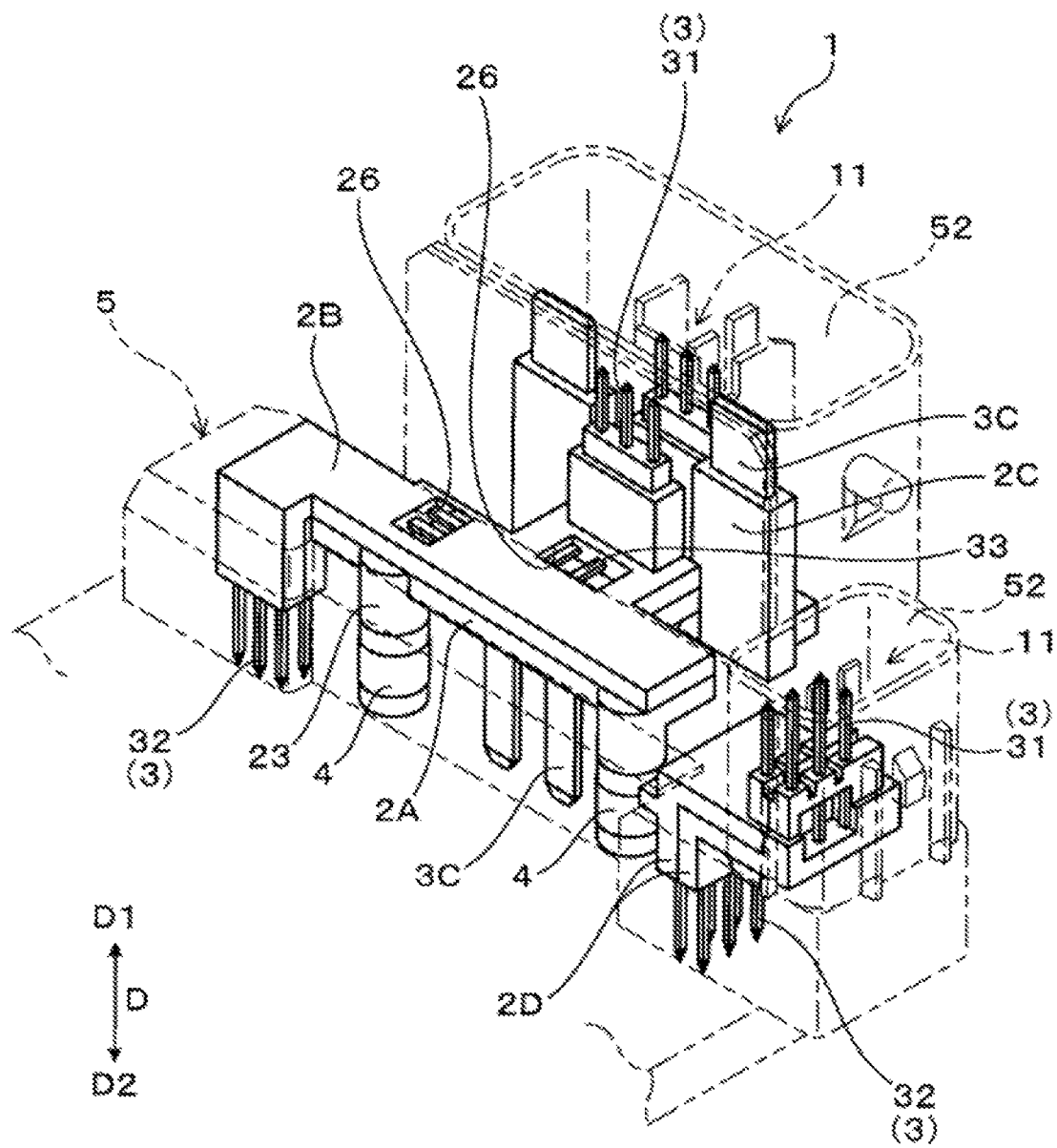
FIG. 1 is a perspective view showing connector terminals, core resin portions, nuts and the like to be arranged in an outer resin portion in a connector according to a first embodiment.

Embodiments of the aforementioned connector and manufacturing method therefor are described with reference to the drawings.

First Embodiment

A connector 1 of this embodiment includes connector terminals 3, core resin portions 2A, 2B, nuts 4 and an outer resin portion 5, as shown in FIGS. 1 to 5. The connector terminals 3 are conductive conductors. Both end parts 31, 32 of the connector terminals 3 project from the core resin portions 2A, 2B, and intermediate parts 33 of the connector terminals 3 (except the both end parts 31, 32) are embedded in the core resin portions 2A, 2B.

Figure 4:
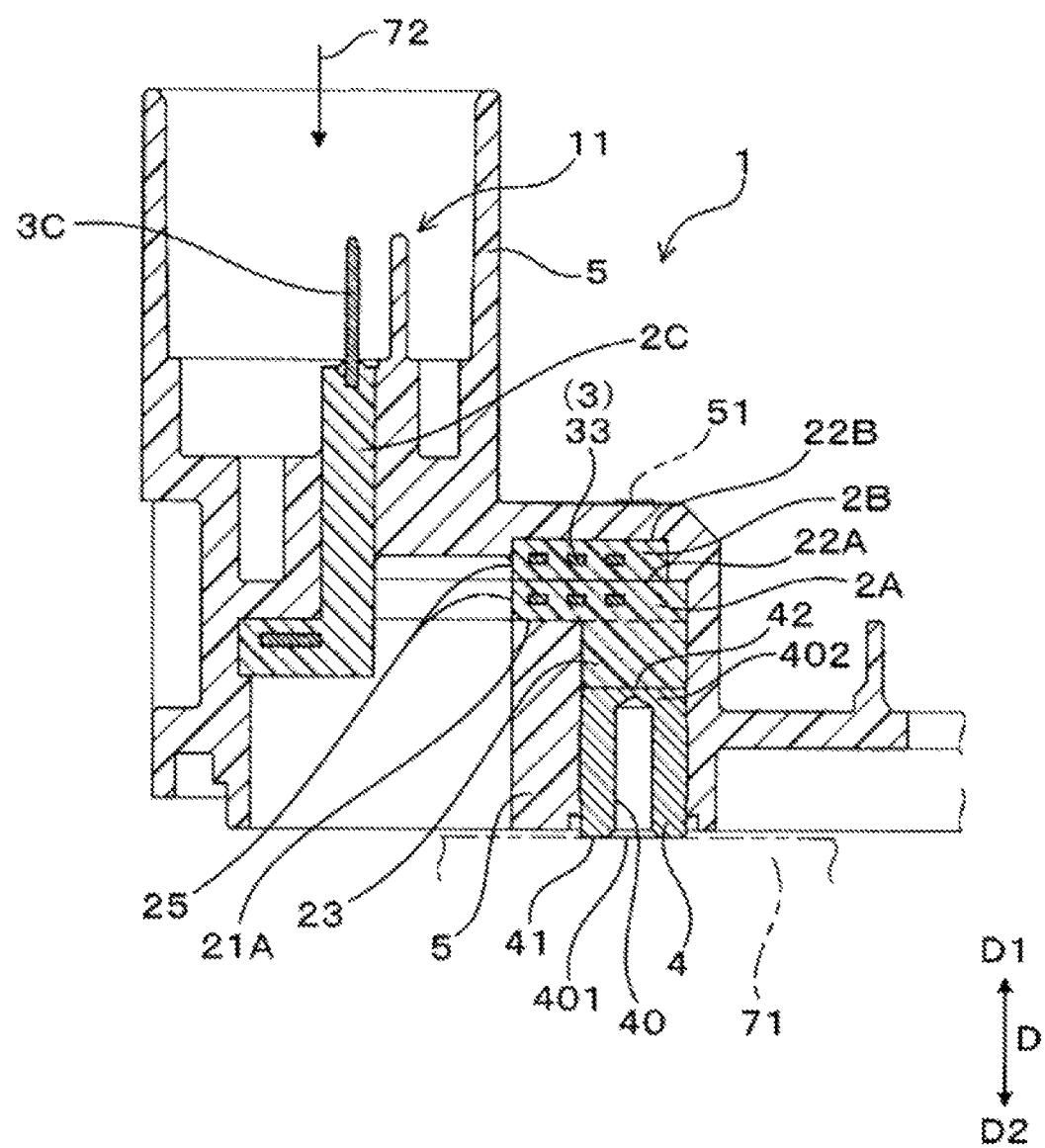
FIG. 4 is a section along IV-IV in FIG. 3 showing the connector according to the first embodiment.
Figure 5:
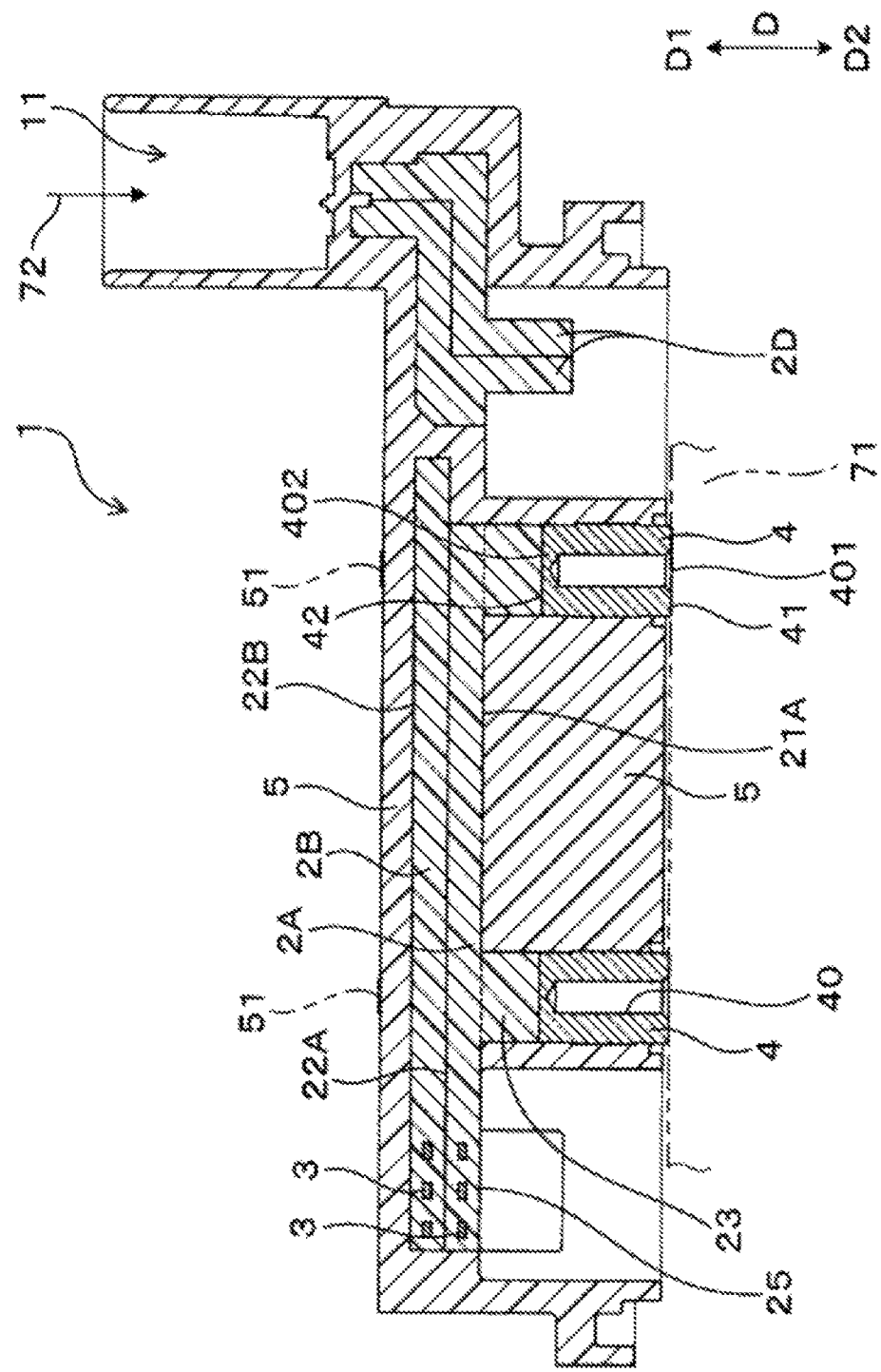
FIG. 5 is a section along V-V in FIG. 3 showing the connector according to the first embodiment.

As shown in FIGS. 1, 4 and 5, the nuts 4 are arranged to face a nut facing surface 21A of the core resin portion 2A. Each nut 4 includes a screw hole 40 extending from an outer end surface 41 located on a side opposite to a side facing the nut facing surface 21A. The outer resin portion 5 covers the core resin portions 2A, 2B and the nuts 4 with exposed surfaces 25 as parts of the core resin portions 2A, 2B and the outer end surfaces 41 of the nuts 4 exposed. Injection marks 51 made during the molding of the outer resin portion 5 are formed on a surface of a part of the outer resin portion 5 covering an opposite side surface 22B of the core resin portion 2A, 2B located on a side opposite to the nut facing surface 21A.

The connector 1 of this embodiment and a manufacturing method therefore are described in detail below.

The connector 1 is used for electrical wiring in an electric power steering of an automotive vehicle. The connector 1 is used as a wiring connecting part for wiring electronic control devices, such as a motor and various sensors used in the electric power steering to a control device. As shown in FIGS. 4 and 5, the connector 1 is mounted on a control board 71 of the control device using the built-in nuts 4. Screw parts of bolts arranged on the side of the circuit board 71 are engaged threadedly with the screw holes 40 of the nuts 4 in the connector 1.

Although not shown, the connector 1 of this embodiment is formed with a mounting portion to be mounted on a case of the electric power steering. This mounting portion is formed by the outer resin portion 5 and is formed into an annular shape to be arranged around an end part of the motor of the electric power steering. Another nut for mounting the mounting portion on the case of the electric power steering is embedded in the mounting portion. Note that the connector 1 can be used in various machine components other than the electric power steering.

A connector case of the connector 1 of this embodiment is formed by the core resin portions 2A, 2B and the outer resin portion 5. The connector case is formed by insert-molding the outer resin portion 5 using the separately molded core resin portions 2A, 2B. A resin material used for the core resin portions 2A, 2B and a resin material used for the outer resin portion 5 are thermoplastic resins of the same type. Note that the type of the resin material used for the core resin portions 2A, 2B and that of the resin material used for the outer resin portion 5 may be different from each other.

As shown in FIGS. 1 to 5, an end of the connector 1 to be mounted on the circuit board 71 is referred to as a back D2 and an end opposite to the back D2 is referred to as a front D1. A direction defining the front D1 and the back D2 is referred to as a mounting direction D. Front end parts 31 of the connector terminals 3 are arranged at the front D1 of the connector 1 and define connecting portions 11 to be connected to female connectors 72. The connector 1 of this embodiment has two connecting portions 11. Cases 52 in the connecting portions 11 are formed by the outer resin portion 5.

(Core Resin Portions 2A, 2B, Connector Terminals 3)

As shown in FIGS. 1 and 5, the connector 1 has core resin portions 2D in addition to the core resin portions 2A, 2B. The core resin portions 2D are arranged not to face the nuts 4, while the core resin portions 2A, 2B are arranged to face the nuts 4. Each of the core resin portions 2A, 2B and 2D is insert-molded with the connector terminals 3 before the outer resin portion 5 of the connector 1 is molded. Each core resin portion 2A, 2B, 2D is used to fix a state of alignment of the connector terminals 3. Thus, the core resin portions 2A, 2B and 2D facilitate manufacturing the connector 1 with the connector terminals 3 aligned properly.

As shown in FIG. 1, the end parts 31, 32 of the connector terminals 3 are formed as male terminals projecting from the core resin portions 2A, 2B. As shown in FIGS. 4 and 5, the front end parts 31 of the connector terminals 3 are used for connection to the female connectors 72, and the rear end parts 32 of the connector terminals 3 are mounted on the circuit board 71. The connector terminals 3 are arranged at appropriate intervals in parallel in the core resin portions 2A, 2B.

As shown in FIGS. 4 and 5, a predetermined number of the connector terminals 3 are arranged in two stages in each core resin portion 2A, 2B of this embodiment. The core resin portions 2A, 2B are molded separately in two stages as a first core resin portion 2A and a second core resin portion 2B to facilitate the molding of the connector 1. The first core resin portion 2A has the nut facing surface 21A facing the nuts 4. The second core resin portion 2B is arranged to face a front D1 of the first core resin portion 2A in the mounting direction D. Note that the other core resin portions 2D also are molded separately in two stages, similar to the core resin portions 2A, 2B.

Figure 3:
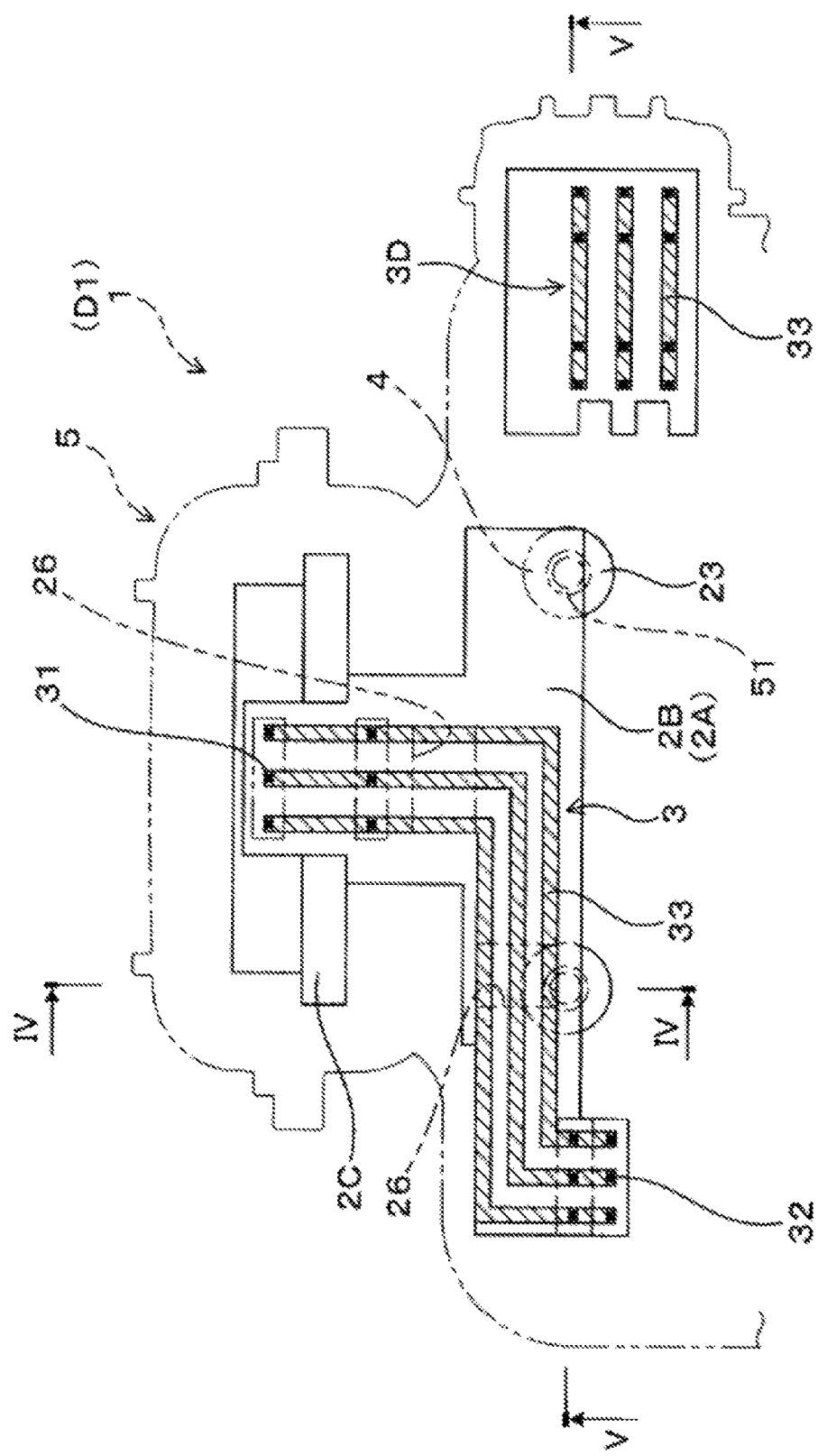
FIG. 3 is a view showing a state where the connector terminals are arranged in the core resin portions of the connector according to the first embodiment.

The end parts 31, 32 of the connector terminals 3 projecting from the respective core resin portions 2A, 2B and 2D are arranged in parallel to the mounting direction D. As shown in FIG. 3, the intermediate parts 33 of the connector terminals 3 embedded in the core resin portions 2A, 2B and 2D are bent from a state parallel to the mounting direction D to a state perpendicular to the mounting direction D.

As shown in FIG. 1, the first and second core resin portions 2A, 2B cover most parts of the intermediate parts 33 of the connector terminals 3. However, the intermediate parts 33 of the connector terminals 3 in the second core resin portion 2B are partially exposed from the second core resin portion 2B through a hole 26 and embedded in the outer resin portion 5. As shown in FIGS. 4 and 5, a part of the first core resin portion 2A covering the intermediate parts 33 of the connector terminals 3 is formed with facing projections 23 facing the nuts 4.

The nut facing surface 21A of the first core resin portion 2A of this embodiment is formed on the tips of the facing projections 23. Further, an opposite surface 22A of the first core resin portion 2A is parallel to the nut facing surface 21A. The part of the first core resin portion 2A covering the intermediate parts 33 of the connector terminals 3 and the part of the second core resin portion 2B covering the intermediate parts 33 of the connector terminals 3 are parallel to each other. The opposite side surface 22B of the second core resin portion 2B is parallel to the nut facing surface 21A of the first core resin portion 2A.

The nut facing surface 21A and the opposite side surfaces 22A, 22B need not necessarily be parallel. The nut facing surface 21A and the opposite side surfaces 22A, 22B may be surfaces present within projection ranges of the outer shapes of inner end surfaces 42 of the nuts 4 when these outer shapes are projected on the first and second core resin portions 2A, 2B along the mounting direction D of the connector 1.

As shown in FIGS. 1 and 4, the connector terminals 3 are used as control terminals of electronic control devices such as the motor and sensors. Power supply terminals (busbars) 3C also are arranged in the connector 1 and have a larger cross-sectional shape than the connector terminals 3. The power supply terminals 3C are arranged in a power supply core resin portion 2C by insert molding. Both end parts of the power supply terminals 3C project from the power supply core resin portion 2C, and intermediate parts of the power supply terminals 3C are embedded in the power supply core resin portion 2C. A part of the power supply core resin portion 2C covering intermediate parts of the power supply terminals 3C is arranged to face a back side D2 of the first core resin portion 2A in the mounting direction D.

(Nuts 4)

As shown in FIGS. 4 and 5, the nut 4 is a bag-like nut with a non-penetrating recessed screw hole 40. In other words, an opening 401 of the screw hole 40 is arranged in the outer end surface 41 of the nut 4, and a bottom part 402 for closing the screw hole 40 is arranged on the inner surface 42 of the nut 4. The bottom part 402 of the nut 4 faces the nut facing surface 21A of the first core resin portion 2A.

The nut 4 is arranged in the connector 1 with the opening 401 of the screw hole 40 in the outer end surface 41 exposed on the back D2 of the connector 1 in the mounting direction D. The nut 4 is made of a metal material to enhance the strength thereof. The nut facing surface 21A of the first core resin portion 2A of this embodiment is arranged on the back D2 of the first core resin portion 2A in the mounting direction D of the connector 1.

(Outer Resin Portion 5)

Figure 2:
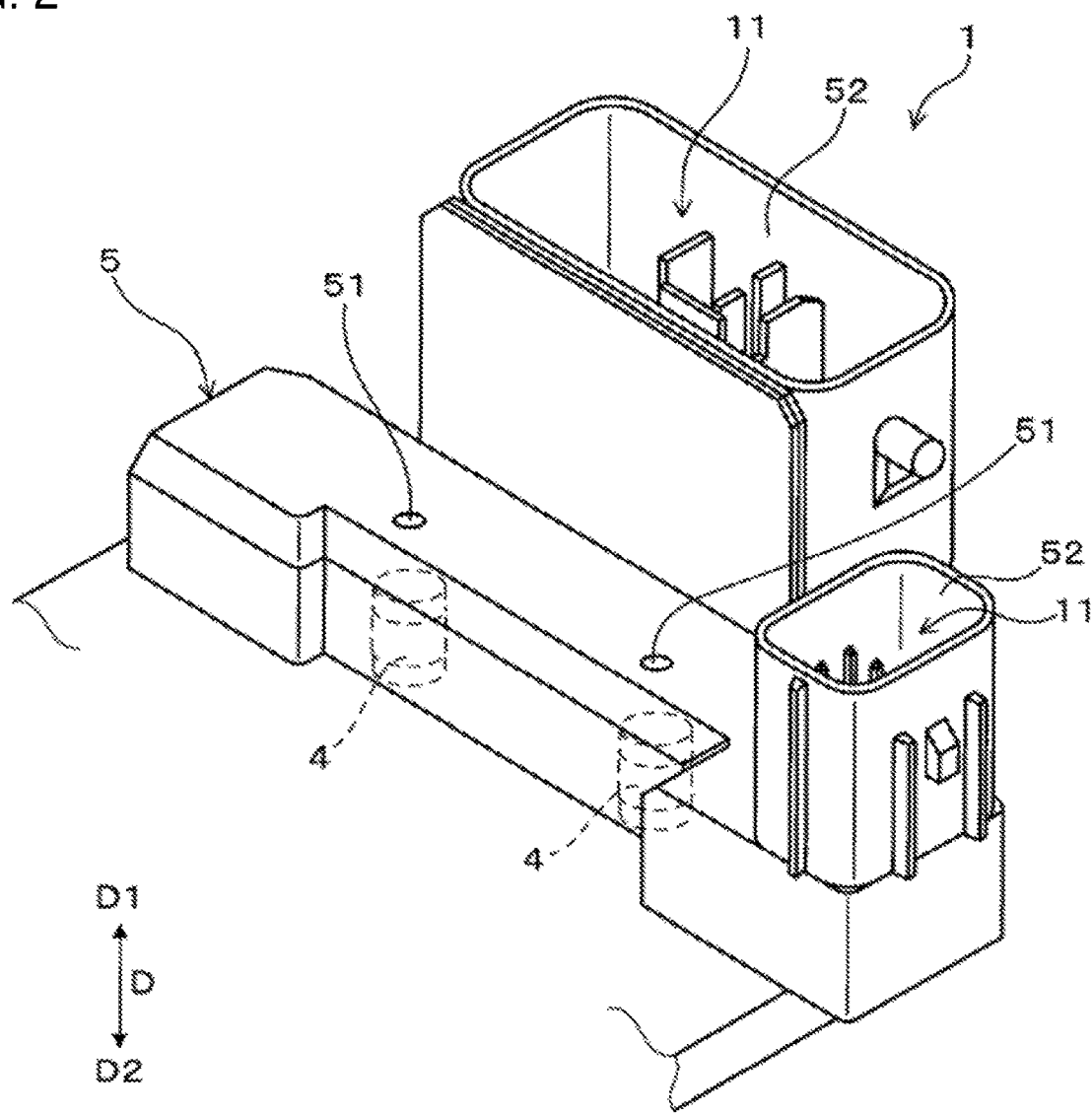
FIG. 2 is a perspective view showing the connector according to the first embodiment.

As shown in FIGS. 1 and 2, the outer resin portion 5 is a resin part forming parts of the connector case other than the core resin portions 2A, 2B and forms the outer shape of the connector case. The core resin portions 2A, 2B and the outer resin portion 5 are integrated in the connector 1, and it is difficult to distinguish the core resin portions 2A, 2B and the outer resin portion 5 from the outside of the connector 1.

However, if the connector 1 is cut, a boundary position between the core resin portions 2A, 2B and the outer resin portion 5 can be confirmed. A resin surface layer is arranged at this boundary position when the core resin portions 2A, 2B are molded This surface layer often has a property different from other parts, such as a high hardness, thereby enabling a confirmation that the core resin portions 2A, 2B are formed in the connector case.

(Mold 6)

Next, a mold 6 used in the manufacturing method for the connector 1 is described.

Figure 6:
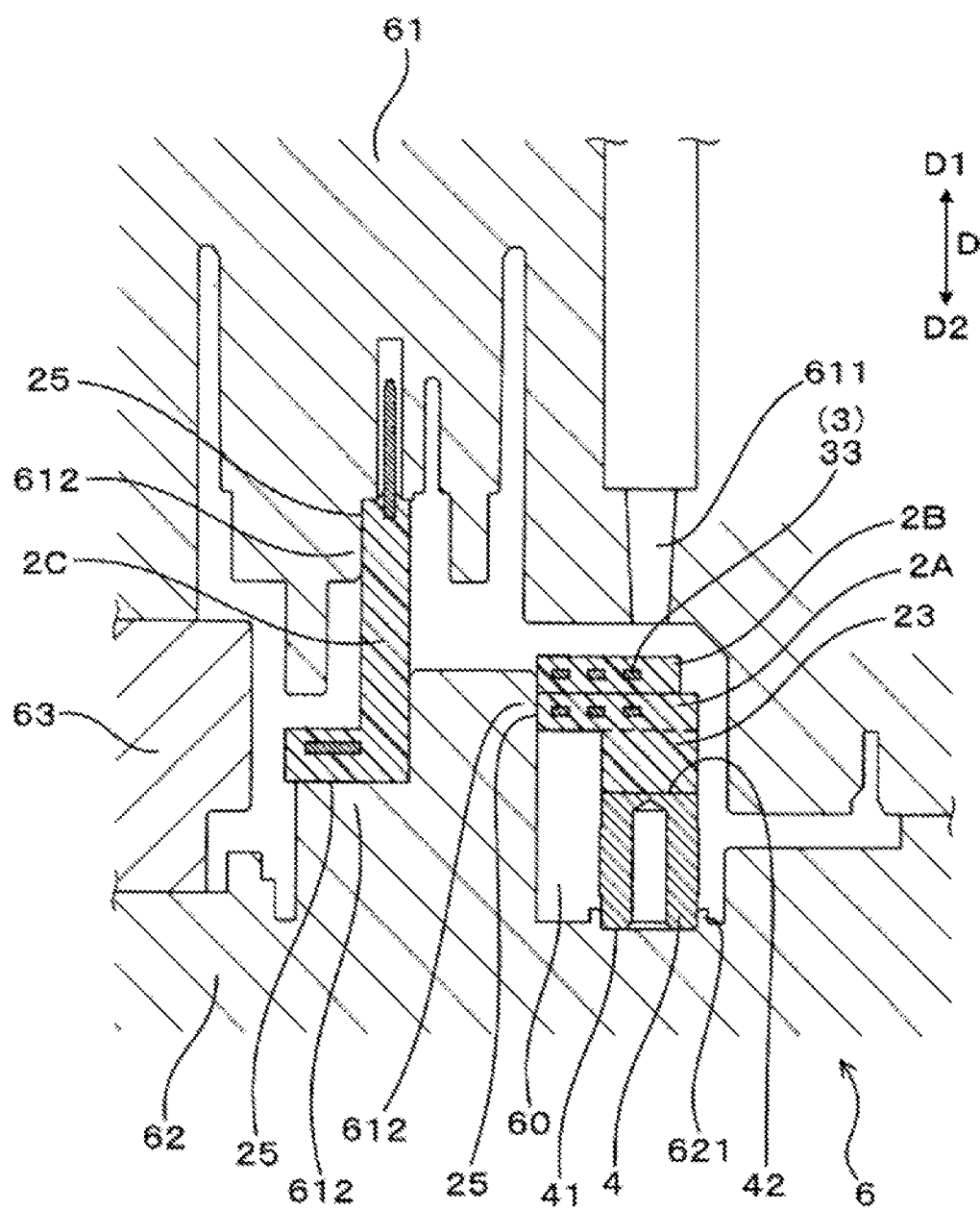
FIG. 6 is a section corresponding to a cross-section along IV-IV in FIG. 3 showing a state where the core resin portions including the connector terminals and the nuts are arranged in a mold according to the first embodiment.
Figure 7:
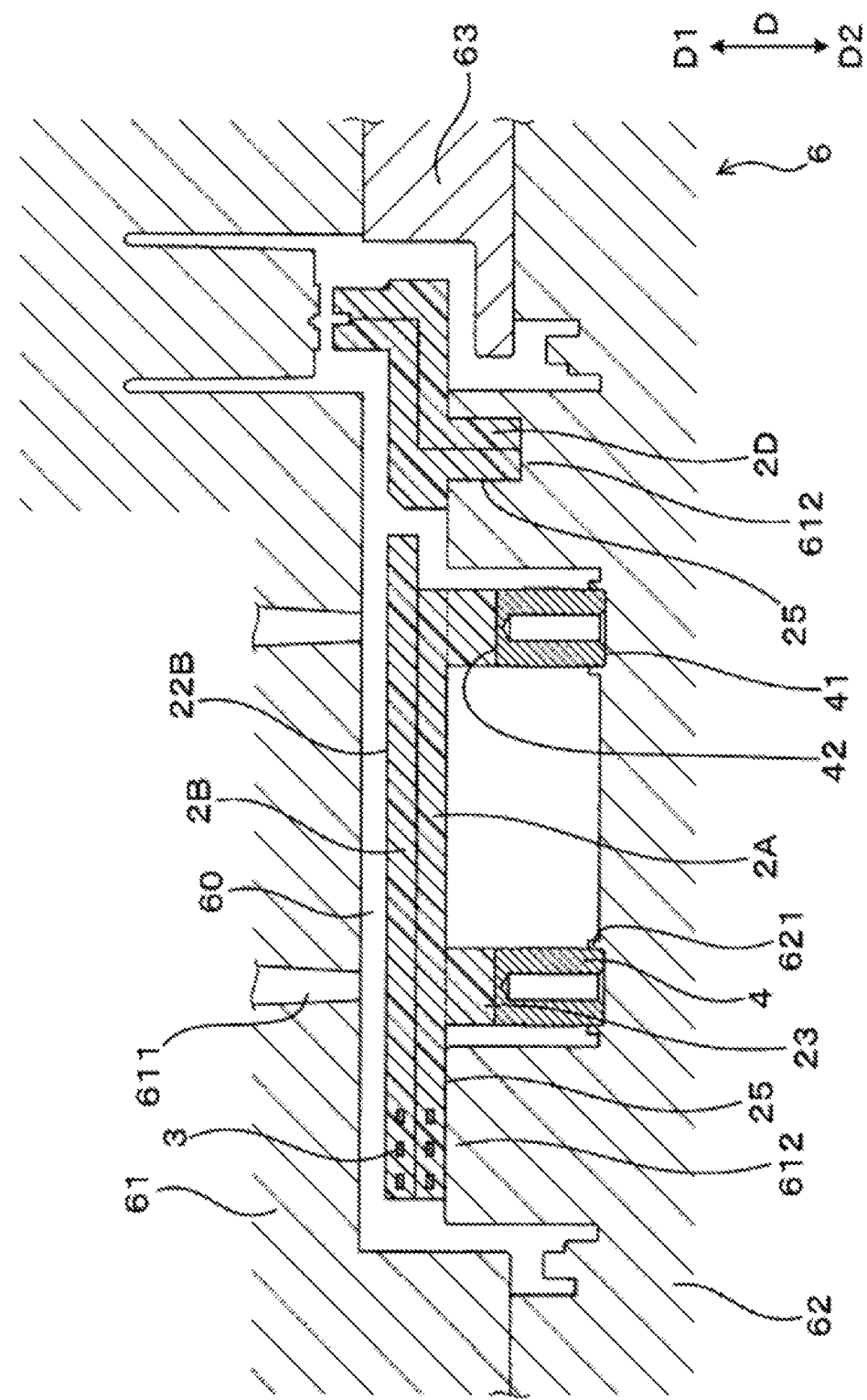
FIG. 7 is a section corresponding to a cross-section along V-V in FIG. 3 showing the state where the core resin portions including the connector terminals and the nuts are arranged in the mold according to the first embodiment.

The outer resin portion 5 of the connector 1 is molded by injection molding. The injection molding uses an injection molding machine with an injection cylinder and the like for injecting molten resin, and the mold 6 to which the molten resin injected from the injection cylinder is supplied is shown in FIGS. 6 and 7 are used. The molten resin is a molten resin material for constituting the outer resin portion 5. The mold 6 is divided into two mold parts 61, 62 and a sliding mold part 63 to enable a molded article to be taken out after molding.

Figure 8:
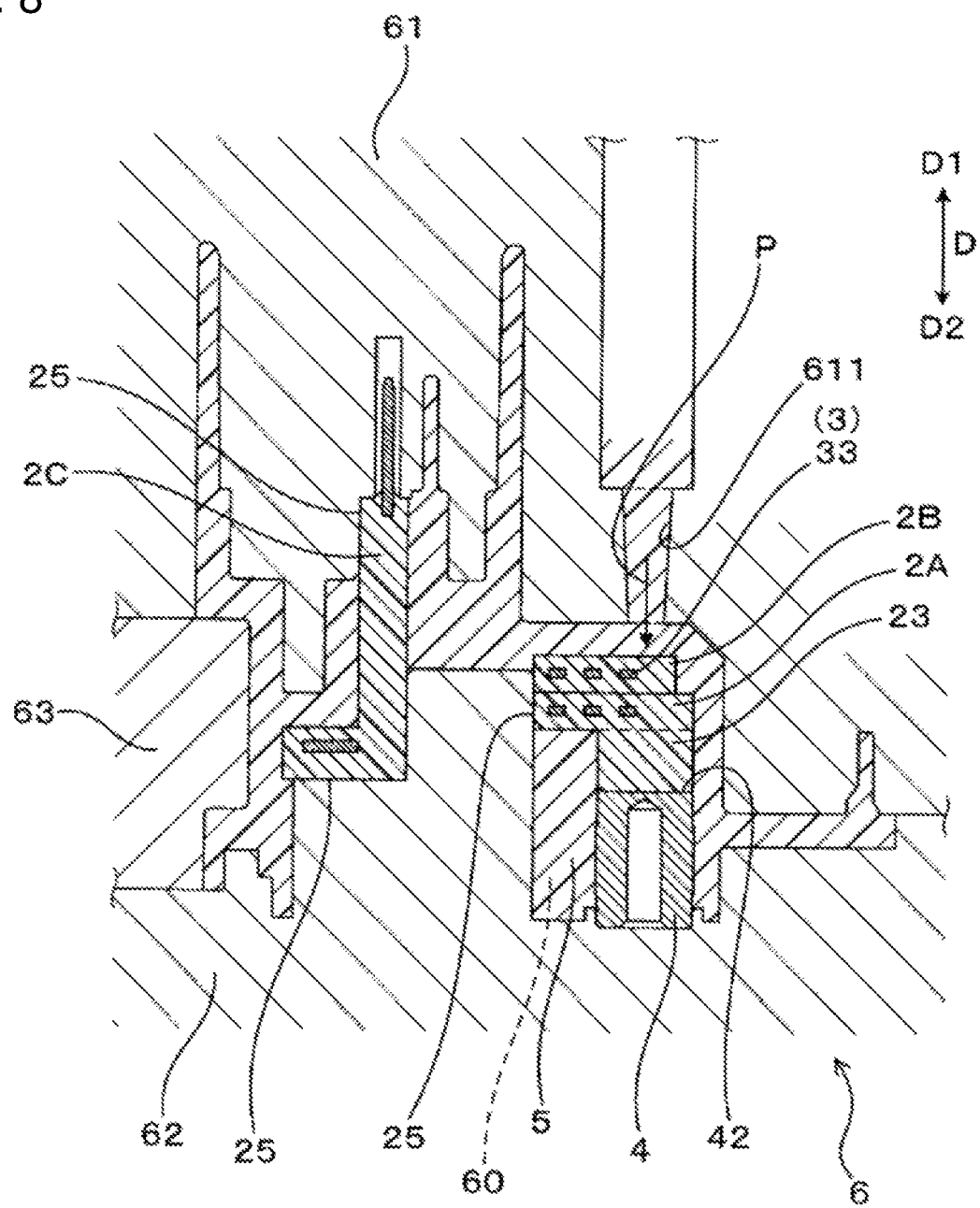
FIG. 8 is a section corresponding to a cross-section along IV-IV in FIG. 3 showing a state where a resin material for constituting an outer resin portion is filled in a cavity of the mold according to the first embodiment.
Figure 9:
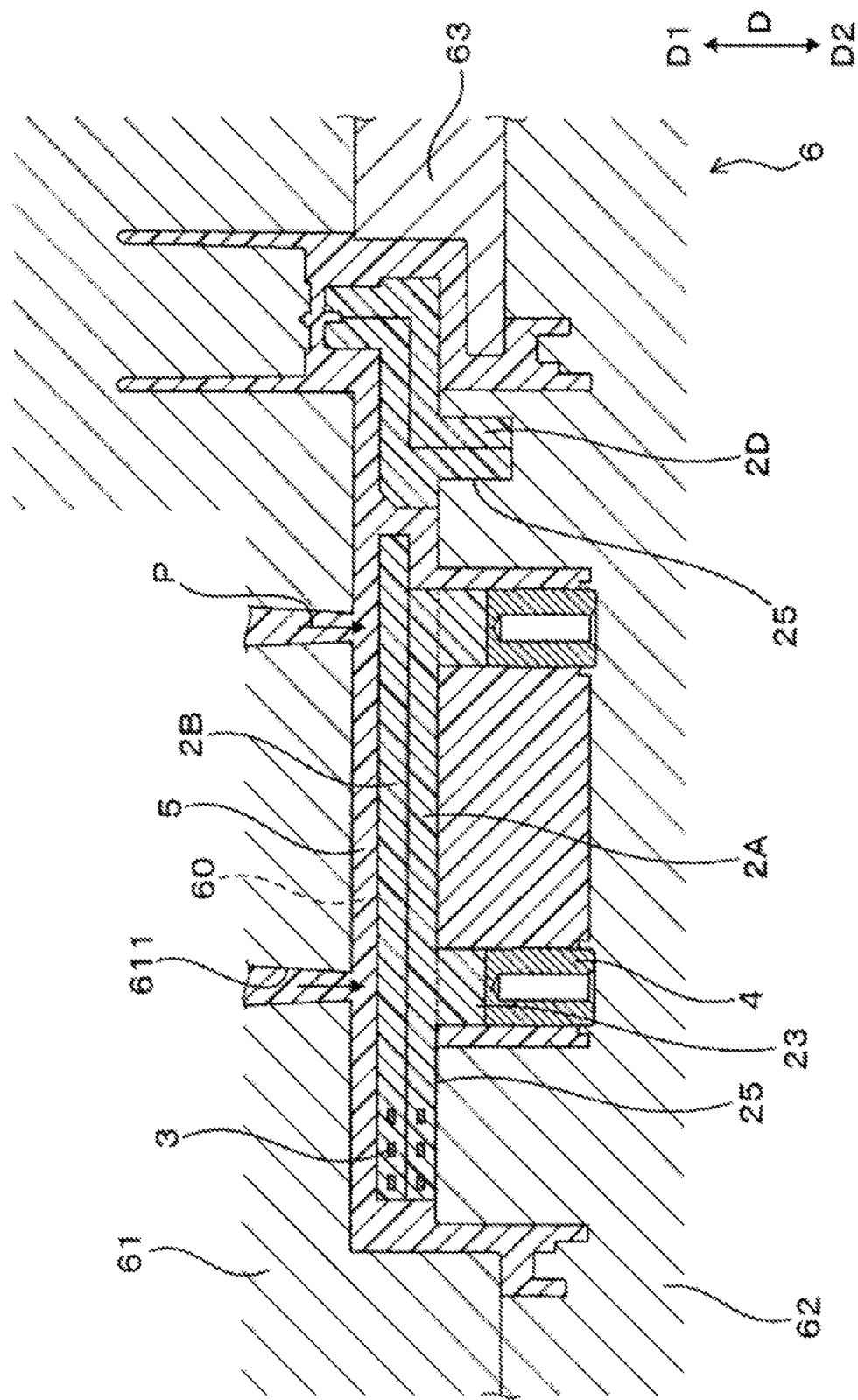
FIG. 9 is a section corresponding to a cross-section along V-V in FIG. 3 showing the state where the resin material for constituting the outer resin portion is filled in the cavity of the mold according to the first embodiment.

As shown in FIGS. 6 and 7, the first and second core resin portions 2A, 2B, the power supply core resin portion 2C, the other core resin portions 2D and the nuts 4 are arranged in the mold 6 for molding the outer resin portion 5. Then, as shown in FIGS. 8 and 9, insert molding is performed using the resin material for constituting the outer resin portion 5 so that the first and second core resin portions 2A, 2B, the power supply core resin portion 2C, the other core resin portions 2D and the nuts 4 are arranged in the outer resin portion 5.

As shown in FIGS. 6 and 7, the two mold parts 61, 62 are composed of a nozzle-side mold part 61 in which an injection nozzle arranged on an end of the injection cylinder of the injection molding machine is arranged and a facing-side mold part 62 forming a cavity 60, into which the molten resin is filled, between the facing-side mold part 62 and the nozzle-side mold part 61. The nozzle-side mold part 61 is formed with gates 611 forming injection ports for injecting the molten resin into the cavity 60.

The gates 61 of this embodiment are at positions facing a surface on the front D1 in the mounting direction D serving as the opposite side surface 22B of the second core resin portion 2B in the nozzle-side mold part 61. More specifically, the gates 611 are at positions in the nozzle-side mold part 61 facing the respective nuts 4 via the first and second core resin portions 2A, 2B. Note that the sliding mold part 63 is used since the connector 1 cannot be taken out after molding merely by opening the mold parts 61, 62.

Further, the nozzle-side mold part 61 and the facing-side mold part 62 are formed with core holding portions 612 for holding the respective core resin portions 2A, 2B, 2C and 2D and positioning the respective core resin portions 2A, 2B, 2C and 2D with respect to the mold parts 61, 62. The core holding portions 612 hold the core resin portions 2A, 2B, 2C and 2D in position in the mold 6 when the outer resin portion 5 is molded.

The core holding portions 612 of the mold parts 61, 62 ensure that the connector terminals 3 and the power supply terminals 3C of the core resin portions 2A, 2B, 2C and 2D cannot contact the mold parts 61, 62. Further, parts of the core resin portions 2A, 2B, 2C and 2D held by the core holding portions 612 of the mold parts 61, 62 form the exposed surfaces 25 of the core resin portions 2A, 2B, 2C and 2D that are exposed on the surface of the outer resin portion 5.

Figure 10:
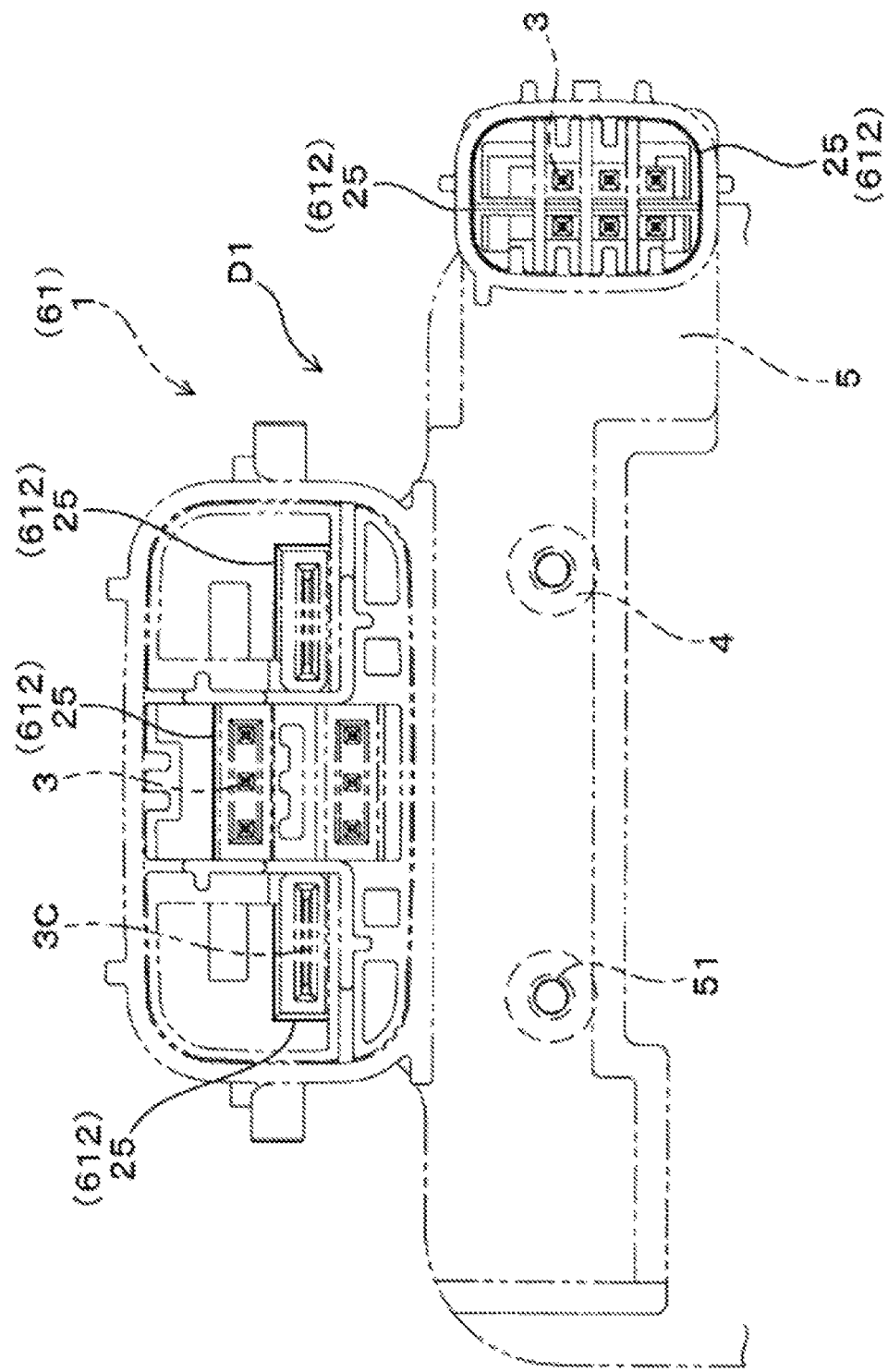
FIG. 10 is a view showing exposed surfaces of the respective core resin portions to be exposed on the surface of the outer resin portion on a front side in a mounting direction of the connector according to the first embodiment.
Figure 11:
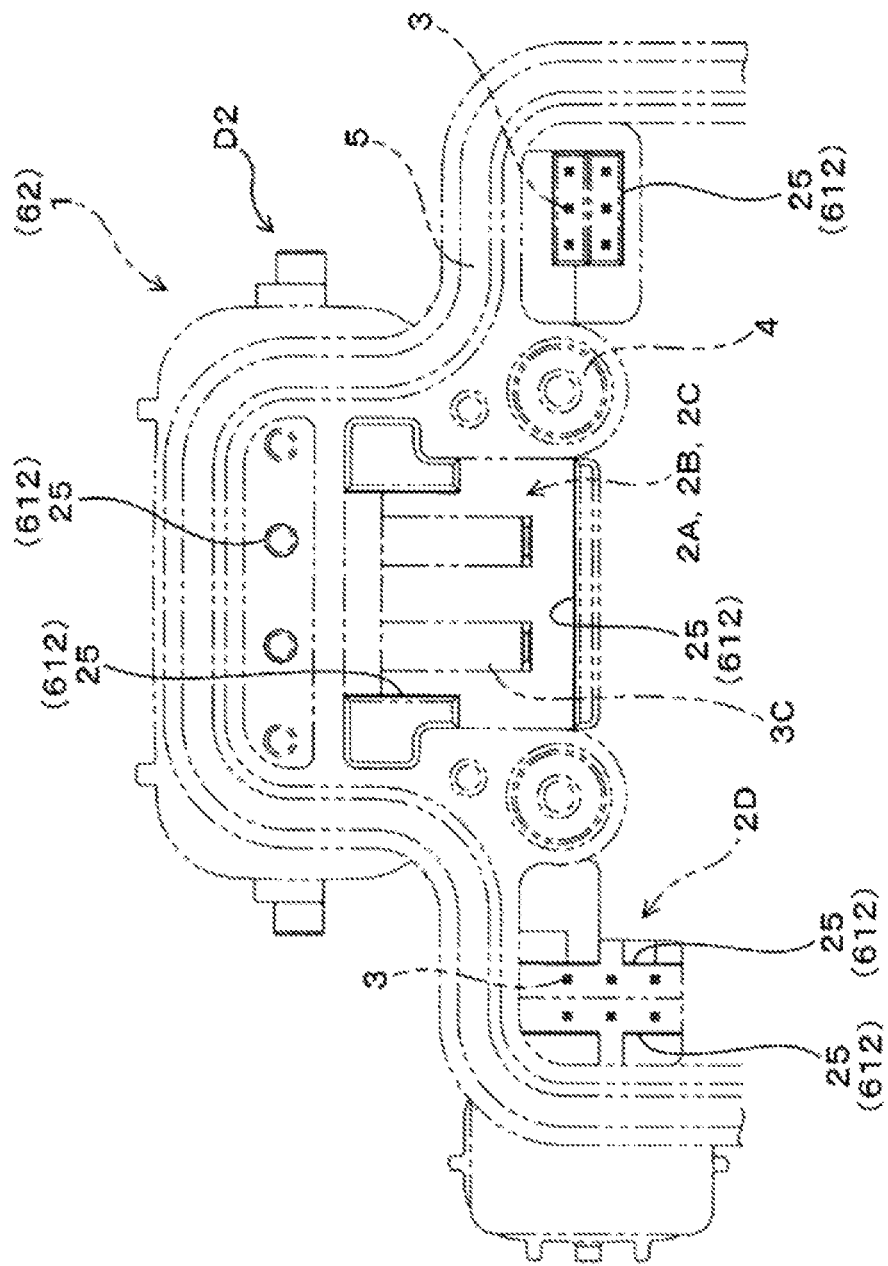
FIG. 11 is a view showing exposed surfaces of the respective core resin portions exposed on the surface of the outer resin portion on a back side in the mounting direction of the connector according to the first embodiment.

FIG. 10 shows the exposed surfaces 25 of the core resin portions 2A, 2B, 2C and 2D and the core holding portions 612 of the nozzle-side mold part 61 corresponding to these exposed surfaces 25 on the front D1 of the connector 1 in the mounting direction D. Further, FIG. 11 shows the exposed surfaces 25 of the respective core resin portions 2A, 2B, 2C and 2D and the core holding portions 612 of the facing-side mold part 62 corresponding to these exposed surfaces 25 on the back D2 of the connector 1 in the mounting direction D.

As shown in FIGS. 6 and 7, the facing-side mold part 62 of this embodiment is formed with nut holding portions 621 for holding the outer peripheries of the nuts 4 near the outer end surfaces 41. The nut holding portions 621 project from a molding surface of the facing-side mold part 62 toward the cavity 60. As shown in FIGS. 4 and 5, the outer end surfaces 41 of the nuts 4 and the outer peripheries thereof near the outer end surfaces 41 are held by the nut holding portions 621, thereby being exposed on the surface of the outer resin portion 5 after molding. Note that the nut holding portion 621 may be shaped to hold the screw hole 40 of the nut 4 or may be shaped to hold the outer end surface 41 of the nut 4, the outer periphery thereof near the outer end surface 41 and the screw hole 40 of the nut 4.

(Injection Marks 51)

Figure 12:
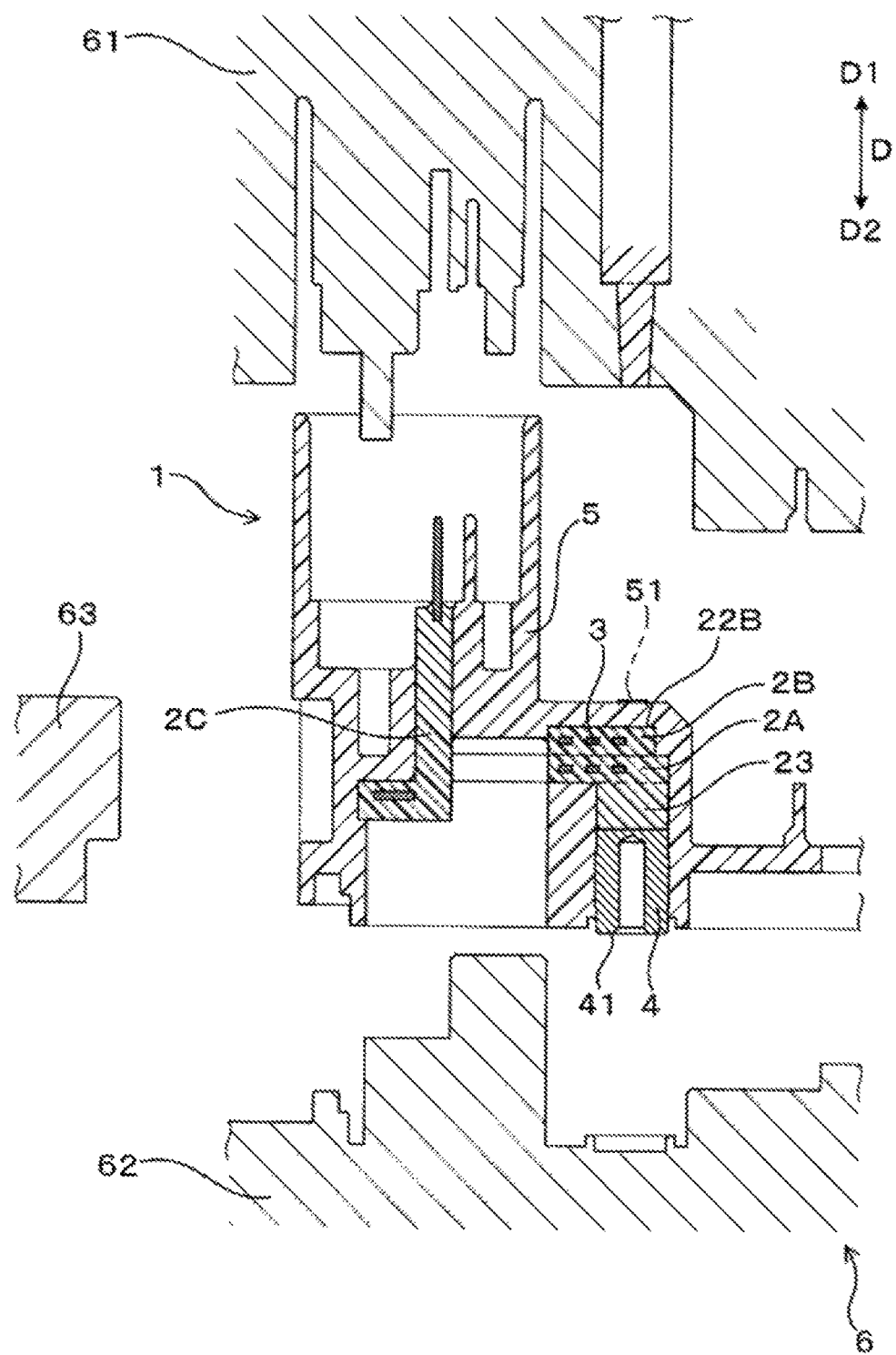
FIG. 12 is a section corresponding to a cross-section along IV-IV in FIG. 3 showing a state where the connector after molding is taken out of the mold according to the first embodiment.

As shown in FIG. 12, the injection marks 51 formed on the surface of the outer resin portion 5 are formed as marks of the resin material (molten resin) arranged at the gates 611 of the nozzle-side mold part 61. Resin material parts arranged at the gates 611 and solidified are cut when the connector 1 manufactured by solidifying the outer resin portion 5 is taken out of the cavity 60 formed by the mold parts 61, 62 and 63. After this cutting, the injection marks 51 having cross-sectional shapes of the gates 611 remain on the surface of the outer resin portion 5. Note that the resin material parts at the gates 611 may be cut after the manufactured connector 1 is taken out of the cavity 60.

As shown in FIGS. 4 and 5, the injection marks 51 of this embodiment are formed on the surface of the part of the outer resin portion 5 covering the opposite side surface 22B of the second core resin portion 2B and facing the nuts 4 via the first and second core resin portions 2A, 2B. The formation positions of these injection marks 51 enable a confirmation that a pressure P during the injection of the resin material applied to the first and second core resin portions 2A, 2B from the gates 611 was applied to the positions facing the nuts 4, as shown in FIGS. 8 and 9. In this way, it can be judged more reliably that the nuts 4 are maintained in targeted specified postures in the connector 1.

(Manufacturing Method)

Next, the manufacturing method for the connector 1 is described in detail.

In the manufacturing method for the connector 1 of this embodiment, the connector 1 is obtained by molding the outer resin portion 5 with the respective core resin portions 2A, 2B, 2C and 2D and the nuts 4 as insert components using the injection molding machine and the mold 6.

In manufacturing the connector 1, the resin material is injected into a mold having the connector terminals 3 arranged therein to mold the first core resin portion 2A as a preliminary step. Further, the resin material is injected into a mold having the connector terminals 3 arranged therein to mold the second core resin portion 2B. Further, the resin material is injected in a mold having the power supply terminals 3C arranged therein to mold the power supply core resin portion 2C. Further, the resin material is injected into a mold having the connector terminals 3 arranged therein to mold the other core resin portion 2D.

Subsequently, the first core resin portion 2A, the second core resin portion 2B, the power supply core resin portion 2C and the other core resin portions 2D are held in the respective core holding portions 612 on the molding surfaces of the mold parts 61, 62, as shown in FIGS. 6 and 7. Further, the nuts 4 are held in the nut holding portions 621 on the molding surface of the facing-side mold part 62. The nozzle-side mold part 61 then is brought closer to the facing-side mold part 62, and the nozzle-side mold part 61 and the facing-side mold part 62 are assembled to form the cavity 60 of the mold 60.

At this time, in the cavity 60, the inner end surface 42 of each nut 4 is facing the nut facing surface 21A of the first core resin portion 2A. Further, each gate 611 of the nozzle-side mold part 61 is facing the opposite side surface 22B of the second core resin portion 2B. More specifically, each gate 611 of the nozzle-side mold part 61 is facing a projection position of the nut 4 on the opposite side surface 22B of the second core resin portion 2B. In other words, the inner end surface 42 of each nut 4 is facing each gate 611 of the nozzle-side mold part 61 via the first and second core resin portions 2A, 2B.

The projection position of the nut 4 can be a projection range of the outer shape of the inner end surface 42 projected on the opposite side surface 22B when the outer shape of the inner end surface 42 of the nut 4 is projected on the opposite side surface 22B of the second core resin portion 2B along the mounting direction D of the connector 1. In a state where each gate 611 and the projection position of the nut 4 are facing each other, at least a part of the formation range of the gate 611 of the nozzle-side mold part 61 and at least a part of the projection range of the outer shape of the inner end surface 42 on the opposite side surface 22B of the second core resin portion 2B may overlap each other when viewed from the mounting direction D.

Subsequently, as shown in FIGS. 8 and 9, the molten resin material is supplied from the injection cylinder and the injection nozzle of the injection molding machine to each gate 611 of the nozzle-side mold part 61. At this time, the resin material is discharged (injected) from the gates 611 toward the opposite side surface 22B of the second core resin portion 2B and collides with the opposite side surface 22B of the second core resin portion 2B at the projection positions of the nuts 4.

In this way, the pressure P during the injection of the resin material acts on the inner end surfaces 42 of the nuts 4 via the second and first core resin portions 2B, 2A. The pressure P during the injection of the resin material presses the nuts 4 against the facing-side mold part 62 via the second and first mold parts 2B, 2A. Further, the nuts 4 cannot move from the nut holding portions 621 of the facing-side mold part 62. Thus, the nuts 4 are maintained in the targeted specified postures in the nut holding portions 621 of the facing-side mold part 62.

The resin material then is filled into the cavity 60 of the mold 6 and the resin material in the cavity 60 is maintained at a predetermined injection pressure and solidified. As a result, the outer resin portion 5 is molded from the resin material and the connector 1 having the connector terminals 3, the power supply terminals 3C, the core resin portions 2A, 2B, 2C and 2D, the nuts 4 and the like built therein is molded in the cavity 60. Thereafter, as shown in FIG. 12, the nozzle-side mold part 61 is separated from the facing-side mold part 62 and the connector 1 is taken out of the cavity 60.

Functions and Effects

The connector 1 of this embodiment is molded using the core resin portions 2A, 2B having the connector terminals 3 arranged therein as insert components in insert-molding the outer resin portion 5. In the molded connector 1, two nuts 4 are arranged in the nut facing surface 21A of the first core resin portion 2A, and the exposed surfaces 25 of the core resin portions 2A, 2B and the outer end surfaces 41 of the nuts 4 are exposed to outside. Further, the injection marks 51 during the molding of the outer resin portion 5 are formed on the surface of the part of the outer resin portion 5 covering the opposite side surface 22B of the second core resin portion 2B and facing the nuts 4 via the first and second core resin portions 2A, 2B.

The exposed surfaces 25 of the core resin portions 2A, 2B exposed on the surface of the outer resin portion 5 are utilized to hold the respective core resin portions 2A, 2B in the core holding portions 612 of the mold parts 61, 62 when molding the outer resin portion 5 in the cavity 60. Further, the outer end surfaces 41 of the nuts 4 are utilized to hold the nuts 4 in the respective nut holding portions 621 of the facing-side mold part 62 when molding the outer resin portion in the cavity 60. The nuts 4 also are supported by the first and second core resin portions 2A, 2B held in the respective core holding portions 612 so as not to change the postures thereof.

Further, the injection marks 51 of the outer resin portion 5 are utilized to inject the resin material for molding the outer resin portion 5 into the cavity 60 from the gates 61 provided in the nozzle-side mold part 61. In molding the outer resin portion 5 in the cavity 60, the core resin portions 2A, 2B and the nuts 4 are held in the respective holding portions 612, 621 of the mold parts 61, 62. At this time, the first and second core resin portions 2A, 2B and the nuts 4 are not sandwiched completely by the of mold parts 61, 62. That is, tiny clearances are formed between the nut facing surface 21A of the first core resin portion 2A and the inner end surfaces 42 of the nuts 4 and between the first and second core resin portions 2A, 2B. The nuts 4 held in the nut holding portions 621 may be moved slightly from the nut holding portions 621 by the resin material flowing in the cavity 60, the postures thereof in the nut holding portions 621 may change and the nuts 4 may be inclined with respect to the nut holding portions 621.

Accordingly, the nuts 4 are pressed against the facing-side mold part 62 via the second and first core resin portions 2B, 2A by causing the resin material to collide with the opposite side surface 22B of the second core resin portion 2B at the projection positions of the nuts 4. In other words, the second and first core resin portions 2B, 2A can be displaced in position toward the respective nuts 4 within a range of the tiny clearances, utilizing the pressure P during the injection of the resin material. In this way, the nuts 4 are maintained in the targeted specified postures in the connector 1 manufactured by molding the outer resin portion 5.

Further, in molding the outer resin portion 5, the nuts 4 are positioned by the nut holding portions 621 formed in the facing-side mold part 62 and serving as shape changed portions. These nut holding portions 621 need not be movable portions capable of moving with respect to the facing-side mold part 62 through rotation, sliding movements or the like, and are formed by changing the shape of the facing-side mold part 62. In this way, the complication of the structure of the mold 6 is prevented.

Therefore, the connector 1 of this embodiment can be molded by the mold 6 having a simple structure and can be molded with the positions and postures of the nuts 4 maintained with high accuracy. Further, according to the manufacturing method for the connector 1 of this embodiment, the connector 1 can be molded with the positions and postures of the nuts 4 maintained with high accuracy by the mold 6 having a simple structure.

(Other Configurations)

Each gate 611 of the nozzle-side mold part 61 of this embodiment is caused to face the projection position of each nut 4 on the opposite side surface 22B of the second core resin portion 2B. Besides this, each gate 611 can be caused to face an appropriate position on the opposite side surface 22B of the second core resin portion 2B. Also in this case, each nut 4 can be pressed against the facing-side mold part 62 via the second and first core resin portions 2B, 2A by the resin material injected into the cavity 61 from the gates 611. Further, in this case, the injection marks 51 are formed at appropriate positions of the part of the outer resin portion 5 covering the opposite side surface 22B of the second core resin portion 2B.

Further, the core resin portion 2A, 2B arranged to face the nuts 4 may not be divided into the first and second core resin portions 2A, 2B if the connector terminals 3 are arranged in one stage without being arranged in two stages. Further, for example, if the connector terminals 3 are arranged in three stages, the core resin portion can be formed by three core resin portions overlapping each other in correspondence with the respective stages.

Second Embodiment

Figure 13:
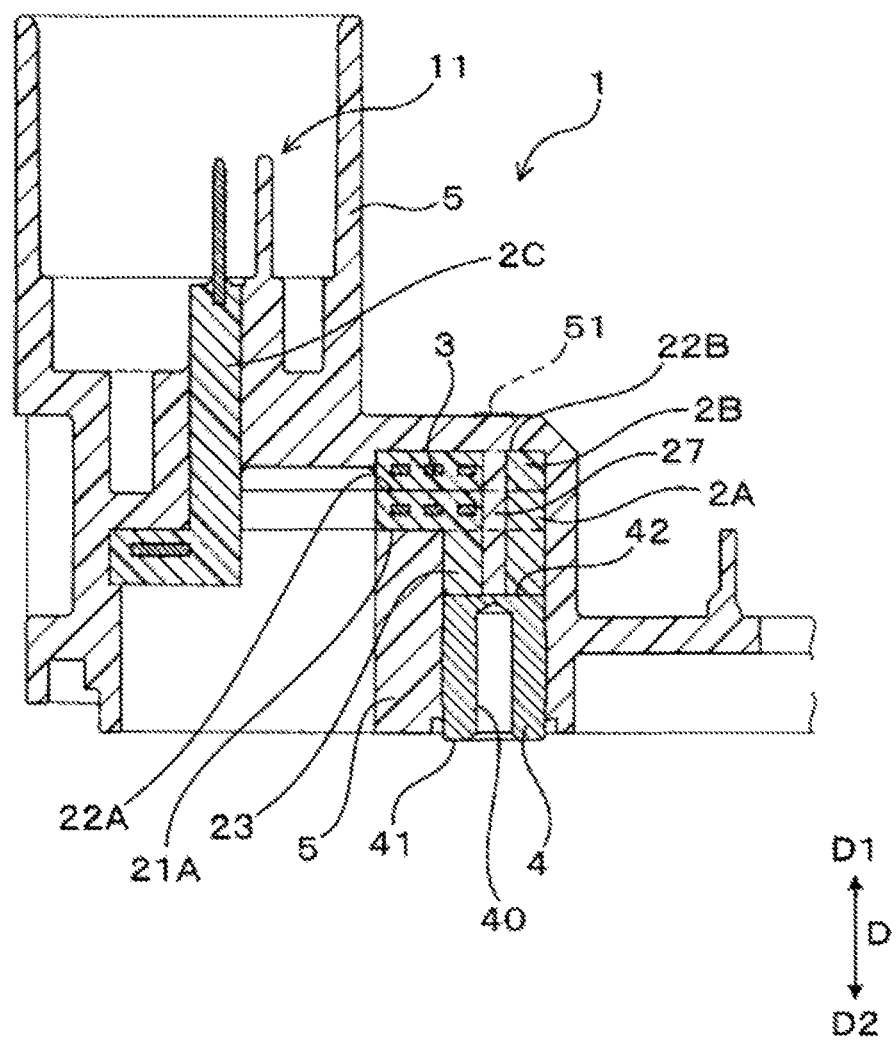
FIG. 13 is a section along IV-IV in FIG. 3 showing a connector according to a second embodiment.
Figure 14:
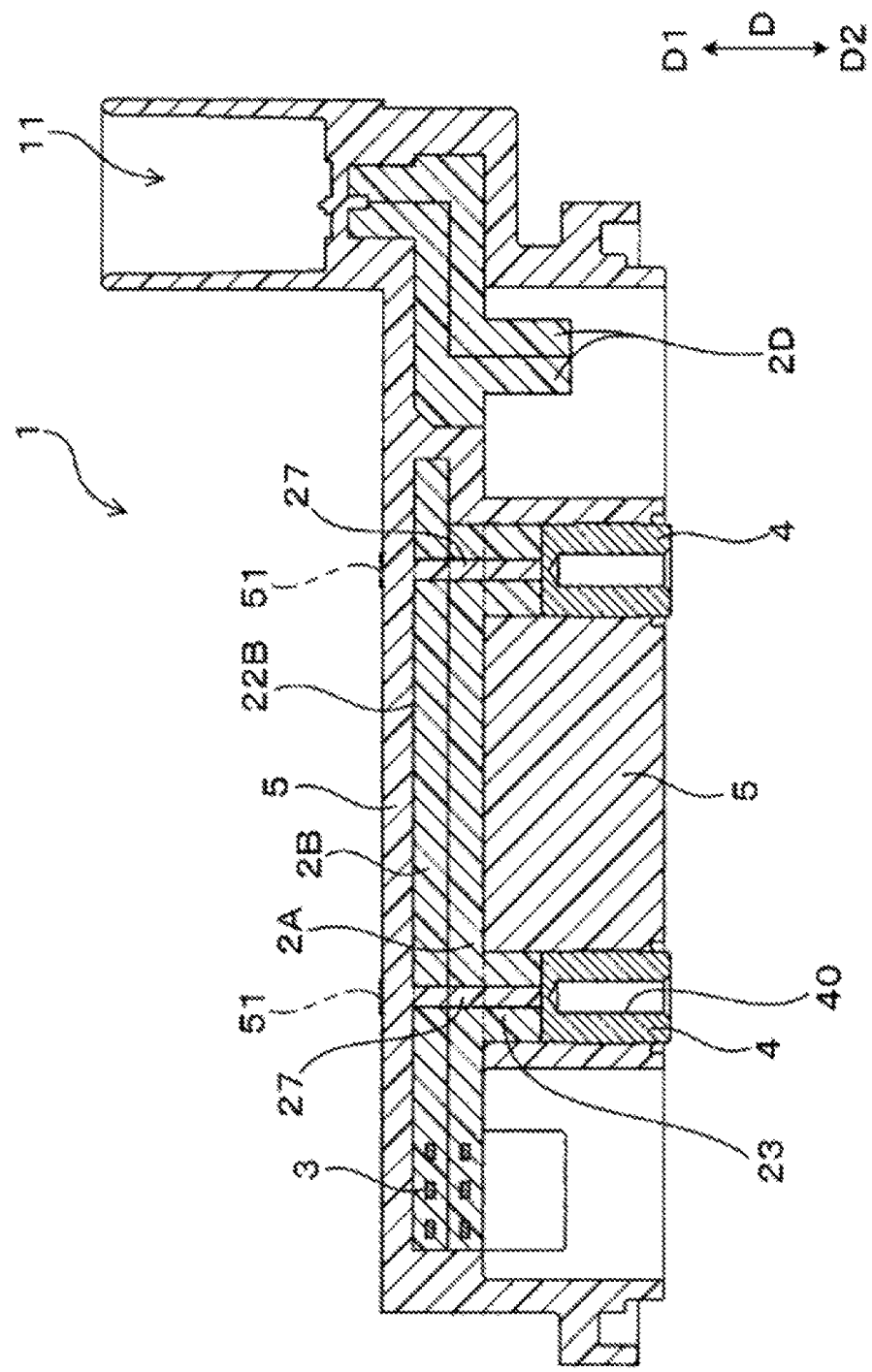
FIG. 14 is a section along V-V in FIG. 3 showing the connector according to the second embodiment.

In a connector 1 of this embodiment, through holes 27 to be filled by an outer resin portion 5 are formed in a first core resin portion 2A and a second core resin portion 2B as shown in FIGS. 13 and 14 to more reliably maintain nuts 4 in specified postures.

As shown in FIGS. 13 and 14, the through holes 27 penetrating toward the nuts 4 are formed in parts of the first and second core resin portions 2A, 2B of this embodiment facing the nuts 4. The through holes 27 of the first core resin portion 2A penetrate from nut facing surfaces 21A of facing projections 23 to an opposite side surface 22A. The through holes 27 of the second core resin portion 2B penetrate at positions facing the through holes 27 of the first core resin portion 2A.

The outer resin portion 5 is filled continuously into the through holes 27 of the first core resin portion 2A and those of the second core resin portion 2B. Further, injection marks 51 of this embodiment are formed on a surface of a part of the outer resin portion 5 covering an opposite side surface 22B of the second core resin portion 2B and facing the through holes 27 of the second core resin portion 2B.

An injection molding machine and a mold 6 used in this embodiment are similar to those of the first embodiment.

In a manufacturing method for the connector 1 of this embodiment, an action when a resin material is injected into a cavity 60 of the mold 6 from gates 611 of a nozzle-side mold part 61 in molding the outer resin portion 5 is different from that of the first embodiment.

In this embodiment, when the cavity 60 is formed by the molds 61, 62 and 63 after the first core resin portion 2A, the second core resin portion 2B, the nuts 4 and the like are held in holding portions 612, 621 on molding surfaces of the respective mold parts 61, 62 as a molding step, inner end surfaces 42 of the nuts 4 are facing the respective through holes 27 of the first and second core resin portions 2A, 2B. Further, the gates 611 of the nozzle-side mold part 61 are facing the respective through holes 27 of the first and second core resin portions 2A, 2B. In other words, the inner end surfaces 42 of the respective nuts 4 are facing the gates 611 of the nozzle-side mold part 61 via the through holes 27 of the first and second core resin portions 2A, 2B.

In a state where the gates 611 and the respective through holes 27 of the first and second core resin portions 2A, 2B are facing each other, at least parts of formation ranges of the gates 611 of the nozzle-side mold part 61 and at least parts of the respective through holes 27 of the first and second core resin portions 2A, 2B may overlap each other in a mounting direction D.

Figure 15:
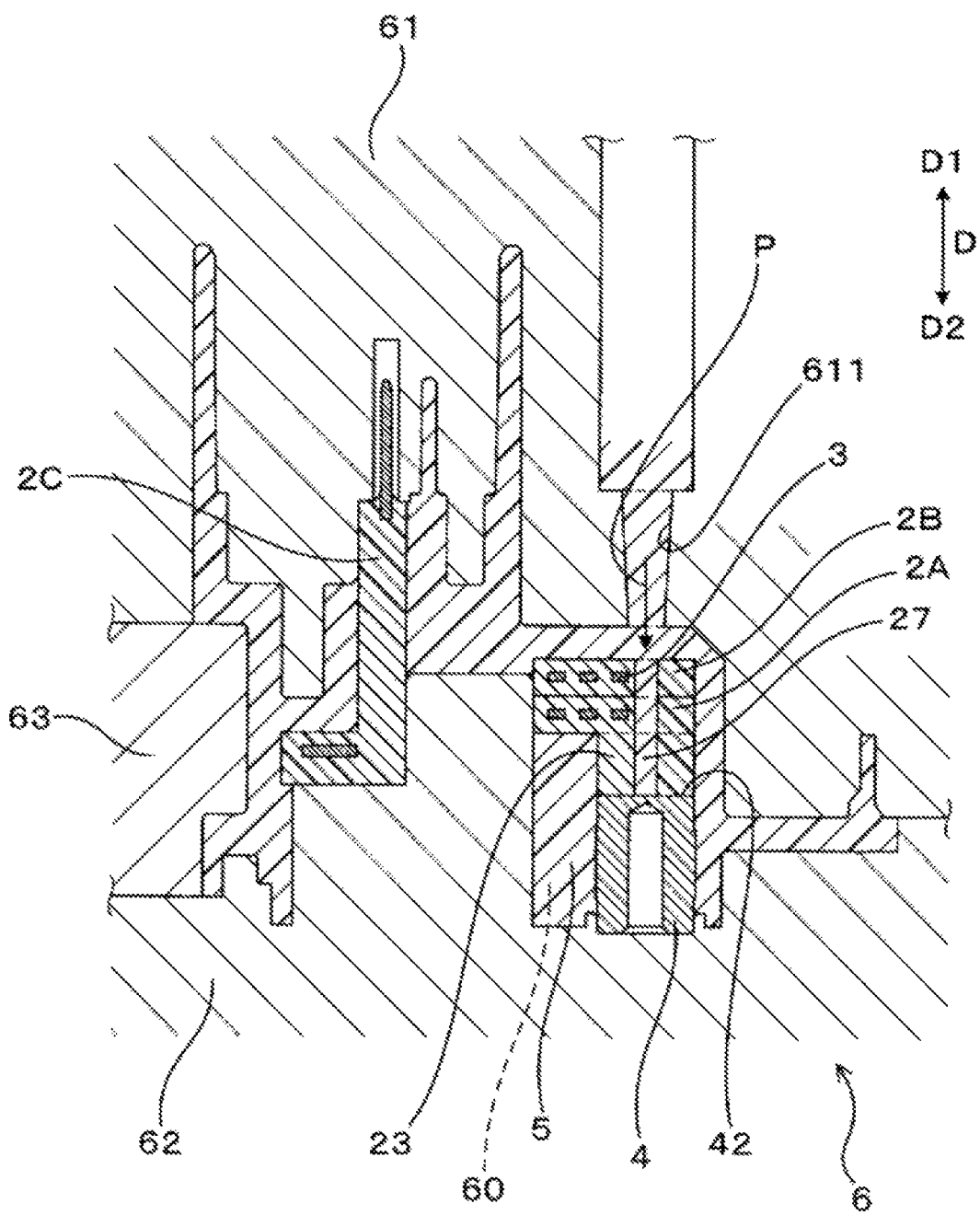
FIG. 15 is a section corresponding to a cross-section along IV-IV in FIG. 3 showing a state where a resin material for constituting an outer resin portion is filled in a cavity of a mold according to the second embodiment.
Figure 16:
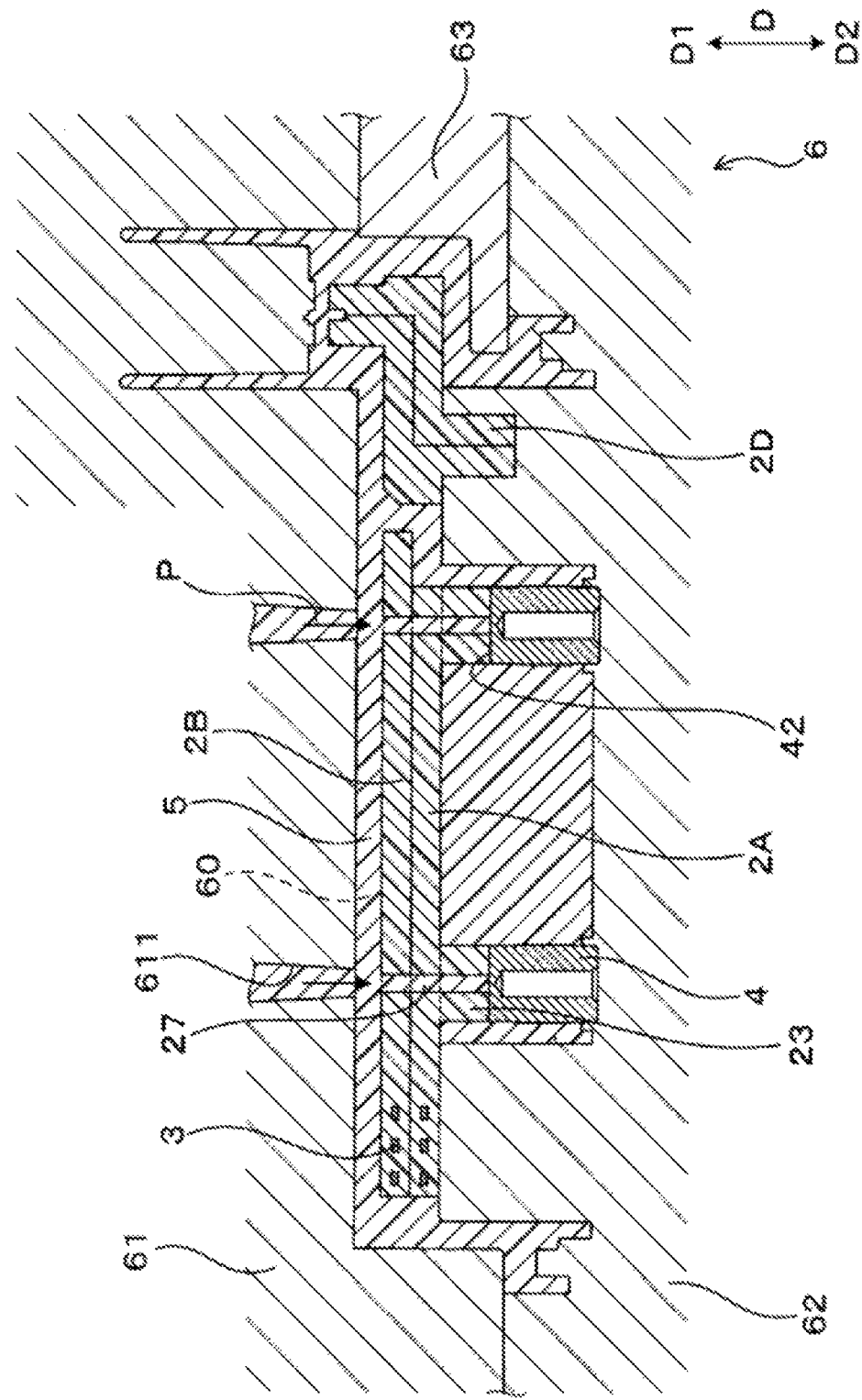
FIG. 16 is a section corresponding to a cross-section along V-V in FIG. 3 showing the state where the resin material for constituting the outer resin portion is filled in the cavity of the mold according to the second embodiment.

Subsequently, as shown in FIGS. 15 and 16, the molten resin material is supplied to the respective gates 611 of the nozzle-side mold part 61 from an injection cylinder and an injection nozzle of the injection molding machine. At this time, the resin material is discharged (injected) from the gates 611 toward the through holes 27 of the first and second core resin portions 2A, 2B, enters the respective through holes 27 and collides with the inner end surfaces 42 of the nuts 4.

In this way, a pressure P during the injection of the resin material can acts on the inner end surfaces 42 of the nuts 4, utilizing the respective through holes 27 of the second and first core resin portions 2B, 2A. The pressure P during the injection of the resin material directly presses the nuts 4 against the facing-side mold part 62, utilizing the through holes 27 of the second and first core resin portions 2B, 2A. Further, the nuts 4 cannot move from the nut holding portions 621 of the facing-side mold part 62. Thus, the nuts 4 can be maintained more reliably in the targeted specified postures in the nut holding portions 621 of the facing-side mold part 62.

The other configurations, functions, effects and the like of the connector 1 and the manufacturing method therefor of this embodiment are similar to those of the first embodiment. Further, also in this embodiment, constituent elements denoted by the same reference signs as those shown in the first embodiment are similar to those of the first embodiment.

The gates 611 of the nozzle-side mold part 61 of this embodiment are caused to face the respective through holes 27 of the first and second core resin portions 2A, 2B as described above. Besides this, the respective gates 611 can be caused to face positions around the through holes 27 on the opposite side surface 22B of the second core resin portion 2B. Also in this case, the nuts 4 can be pressed directly against the facing-side mold part 62 by the resin material injected into the cavity 60 from the gates 611, utilizing the respective through holes 27 of the second and first core resin portions 2B, 2A. Further, in this case, the injection marks 51 are formed around the positions facing the through holes 27 of the part of the outer resin portion 5 covering the opposite side surface 22B of the second core resin portion 2B.

Further, the core resin portion arranged to face the nuts 4 may not be divided into the first and second core resin portions 2A, 2B as in the first embodiment. Further, the core resin portion arranged to face the nuts 4 may be formed from three or more core resin portions overlapping each other.

The invention is not limited to only the respective embodiments and different embodiments can be further configured without departing from the gist of the present invention. Further, the present invention includes various modifications, modifications within the scope of equivalents and the like.

The invention claimed is:
1. A connector, comprising:
a plurality of connector terminals;

a core resin portion formed such that both end parts of the plurality of connector terminals project therefrom and intermediate parts of the plurality of connector terminals except the both end parts are embedded therein;

one or more nuts arranged to face a nut facing surface of the core resin portion and including a screw hole formed to extend from an outer end surface located on a side opposite to a side facing the nut facing surface; and an outer resin portion for covering the core resin portion and the nut with a part of the core resin portion and the outer end surface of the nut exposed, an injection mark formed during molding of the outer resin portion being formed on a surface of a part of the outer resin portion covering an opposite side surface of the core resin portion located on a side opposite to the nut facing surface.

2. The connector of claim 1, wherein the injection mark is formed on a surface of a part of the outer resin portion covering the opposite side surface and facing the nut via the core resin portion.

3. The connector of claim 1, wherein:
a through hole penetrating toward the nut is formed in a part of the core resin portion facing the nut, and
the through hole is filled by the outer resin portion.

4. The connector of claim 3, wherein the injection mark is formed on a surface of a part of the outer resin portion covering the opposite side surface and facing the through hole of the core resin portion.

5. A connector manufacturing method by insert molding by arranging a core resin portion having a plurality of connector terminals arranged therein and one or more nuts arranged to face the core resin portion in a mold and injecting a resin material for constituting an outer resin portion for covering the core resin portion and the nut into the mold, the manufacturing method comprising:

causing the core resin portion and the nut to face each other in the mold; and causing a gate of the mold for the resin material to face an opposite side surface of the core resin portion located on a side opposite to a nut facing surface facing the nut and injecting the resin material toward the opposite side surface from the gate.

6. The connector manufacturing method of claim 5, wherein the gate is caused to face a projection position of the nut on the opposite side surface, and the resin material injected from the gate is caused to collide with the opposite side surface at the projection position of the nut.

7. The connector manufacturing method of claim 5, wherein
a through hole penetrating toward the nut is formed in a part of the core resin portion facing the nut, and
a pressure during injection of the resin material being injected from the gate is caused to act on the nut via the through hole.

8. The connector manufacturing method of claim 7, wherein the gate is caused to face the through hole, and the resin material is injected toward the through hole from the gate.

* * * * *